US012792361B2

(12) United States Patent
Bruno et al.

(10) Patent No.: US 12,792,361 B2
(45) Date of Patent: Nov. 10, 2026

(54) BOOT ORDER RESTORATION

(71) Applicant: Dell Products L.P., Round Rock, TX (US)

(72) Inventors: Eric Joseph Bruno, Shirley, NY (US); Ravinder Tamishetty, Bukit Merah (SG); Nyi Nyi Thwin, Singapore (SG); Wang Xingyu, Singapore (SG); Oliver Chan Yew Khuen, Singapore (SG)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/925,957

(22) Filed: Oct. 24, 2024

(65) Prior Publication Data

US 2026/0119192 A1 Apr. 30, 2026

(51) Int. Cl.
*G06F 9/4401* (2018.01)

(52) U.S. Cl.
CPC .................................. *G06F 9/4408* (2013.01)

(58) Field of Classification Search
CPC .... G06F 9/4408; G06F 9/4401; G06F 9/4406; G06F 9/441; G06F 9/4416; G06F 8/65
USPC .............................................................. 713/2
See application file for complete search history.

(56) References Cited

U.S. PATENT DOCUMENTS

| | | | | |
|---|---|---|---|---|
| 10,055,234 | B1 * | 8/2018 | Rao | G06F 9/4401 |
| 10,146,550 | B2 * | 12/2018 | Dambal | G06F 3/0632 |
| 10,754,955 | B2 * | 8/2020 | Jreij | H04L 9/083 |
| 11,150,911 | B2 * | 10/2021 | Kondapi | G06F 9/4416 |
| 11,243,840 | B2 * | 2/2022 | Liu | G06F 11/1417 |
| 11,687,431 | B2 * | 6/2023 | Sethi | G06F 11/3006 713/1 |
| 12,608,213 | B2 * | 4/2026 | McNulty | G06F 21/575 |
| 12,613,970 | B2 * | 4/2026 | Singh | G06F 21/575 |
| 2020/0210203 | A1 * | 7/2020 | Madala | G06F 8/65 |
| 2020/0250293 | A1 * | 8/2020 | Paulraj | G06F 9/441 |
| 2024/0103837 | A1 * | 3/2024 | Sayyed | G06F 21/602 |

* cited by examiner

*Primary Examiner* — Brian T Misiura
(74) *Attorney, Agent, or Firm* — Chamberlain, Hrdlicka, White, Williams & Aughtry; Aly Z. Dossa

(57) ABSTRACT

A method for automatically setting a primary operating system as first on a boot order list on an edge device includes performing a first scan, via a motherboard, of default boot paths on local storage to discover a recovery operating system. In addition, the method includes auto-populating, using the motherboard, the boot order list to place the recovery operating system as first in the boot order list in response to the first scan. Moreover, the method includes booting to the recovery operating system in response to the auto-populating. The method further includes performing a first update, using the recovery operating system, to the boot order list to remove the recovery operating system from the boot order list and to place the primary operating system as first in the boot order list. Additionally, the method includes booting to the primary operating system after updating.

20 Claims, 4 Drawing Sheets

BOOT ORDER RESTORATION

BACKGROUND

Computing systems typically require all of their components to be functioning properly to operate efficiently. However, computing components frequently become compromised, requiring replaced. Replacing and setting up computing components is often a difficult and time-consuming task, typically requiring information technology (IT) expertise.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

DETAILED DESCRIPTION

A motherboard enables communication between the physical components of a computing device and stores certain information to enable such communication. This information includes the storage location of an operating system, a boot order list, and other settings (e.g., settings for a basic input/output system (BIOS), Unified Extensible Firmware Interface (UEFI), etc.), each of which may be set manually. However, motherboards may fail in edge devices for a myriad of reasons, (e.g., power surges, overheating, manufacturing defects, etc.) and this information may be lost. When a motherboard is replaced in an edge device, the original boot order list and some or all of the settings may be lost. Recovering the original boot order list and the settings can be a difficult task often requiring information technology (IT) expertise. Further, motherboards may fail in locations where IT expertise is limited or non-existent, and physical access to devices is difficult, if not impossible. Thus, providing an automated motherboard setup may be beneficial.

As a result of the limitations of traditional motherboard recovery methods discussed above, embodiments provided herein are directed to an automated motherboard recovery system that is able to populate a cleared boot order list on a motherboard and restore the motherboard's settings.

The following describes one or more embodiments.

Figure 1:
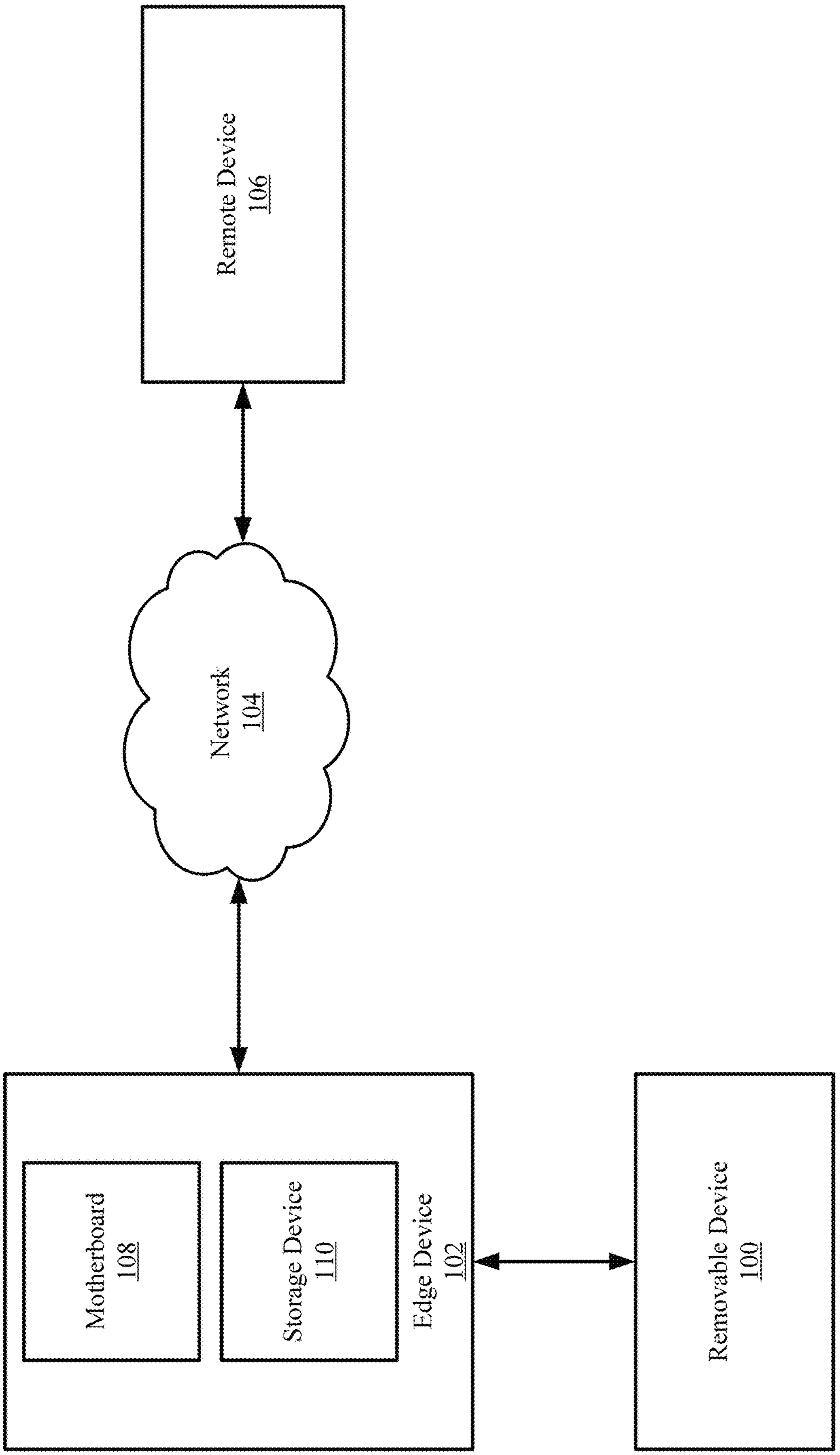
FIG. 1 shows a system in accordance with one or more embodiments.

FIG. 1 shows a system in accordance with one or more embodiments. The system may include a removable device (100), an edge device (102), a network (104), a remote device (106), a motherboard (108), and a storage device (110). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the removable device (100) may be a removable hardware component that operatively connects to the edge device (102). Non-limiting examples of the removable device (100) include a flash drive, an external hard drive, a compact disc, a cellular telephone, and/or any other device that may interact with the edge device (102) to allow for the exchange of data (e.g., a primary operating system, a recovery operating system, etc.), a between the edge device (102) and the removable device (100). Further, the removable device (100) may include functionality to perform at least a portion of the methods shown in FIGS. 2-3. One of ordinary skill in the art will appreciate that the removable device (100) may perform other functionalities without departing from the scope of the embodiment disclosed herein.

In one or more embodiments, the edge device (102) may be a physical device such as a personal computing system (e.g., a laptop, a cell phone, a tablet computer, a server, etc.) configured for hosting one or more workloads, or for providing a computing environment whereon workloads may be implemented. For example, the edge device (102) may be a computing system (e.g., 400, FIG. 4) as discussed below in more detail in FIG. 4. In one or more embodiments, the edge device (102) may include a set of computing components (e.g., a motherboard (e.g., 108), a storage device (e.g., 110), a processor (not shown), etc.). In one or more embodiments, the edge device (102) may include a user interface (e.g., a graphical user interface) (not shown) that allows a user to interact with the edge device (102) (e.g., interacting with the motherboard's (108) BIOS and boot order list to set up the motherboard (108)). It should be appreciated, that the computing components may need to be replaced. In one or more embodiments, the computing components may be removable and replaceable.

In one or more embodiments, the edge device (102) may include any number of applications (and/or content accessible through the applications) that provide computer-implemented services to a user. Applications may be designed and configured to perform one or more functions instantiated by a user of the edge device (102). In order to provide application services, each application may host similar or different components. The components may be, for example (but not limited to), instances of databases, instances of email servers, etc. Applications may be executed on one or more edge device(s) (102) as instances of the application.

Applications may vary in different embodiments, but in certain embodiments, applications may be custom developed or commercial (e.g., off-the-shelf) applications that a user desires to execute on the edge device (102). In one or more embodiments, applications may be logical entities executed using computing resources of the edge device (102). For example, applications may be implemented as computer instructions stored on persistent storage of the edge device (102) that when executed by the processor(s) of the edge device (102), cause the edge device (102) to provide the functionality of the applications described throughout the application.

In one or more embodiments, while performing, for example, one or more operations requested by a user, applications installed on the edge device (102) may include functionality to request and use physical and logical resources of the edge device (102). Applications may also include functionality to use data stored in storage/memory resources of the edge device. The applications may perform other types of functionalities not listed above without departing from the scope of the embodiments disclosed herein. While providing application services to a user, applications may store data that may be relevant to the user in storage/memory resources of the edge device.

In one or more embodiments, to provide services to the users, the edge device (102) may utilize, rely on, or otherwise cooperate with an infrastructure nodes IN (not shown). For example, the edge devices may issue requests to the IN to receive responses and interact with various components of the IN. The edge device (102) may also request data from and/or send data to the IN (for example, the edge devices may transmit information to the IN that allows the IN to perform computations, the results of which are used by the edge device (102) to provide services to the users). As yet another example, the edge device (102) may utilize computer-implemented services provided by the IN. When the edge devices interact with the IN, data that is relevant to the edge device (102) may be stored (temporarily or permanently) in the IN.

In one or more embodiments, the edge device (102) may be capable of, e.g.: (i) collecting users' inputs, (ii) correlating collected users' inputs to the computer-implemented services to be provided to the users, (iii) communicating with IN that perform computations necessary to provide the computer-implemented services, (iv) using the computations performed by the infrastructure nodes to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the edge devices (102) may provide computer-implemented services to users (and/or other computing devices). The edge devices may provide any number and any type of computer-implemented services. To provide computer-implemented services, an edge device may include a collection of physical components (e.g., processing resources, storage/memory resources, networking resources, etc.) configured to perform operations of the edge device and/or otherwise execute a collection of logical components (e.g., virtualization resources) of the edge device.

Figure 2:
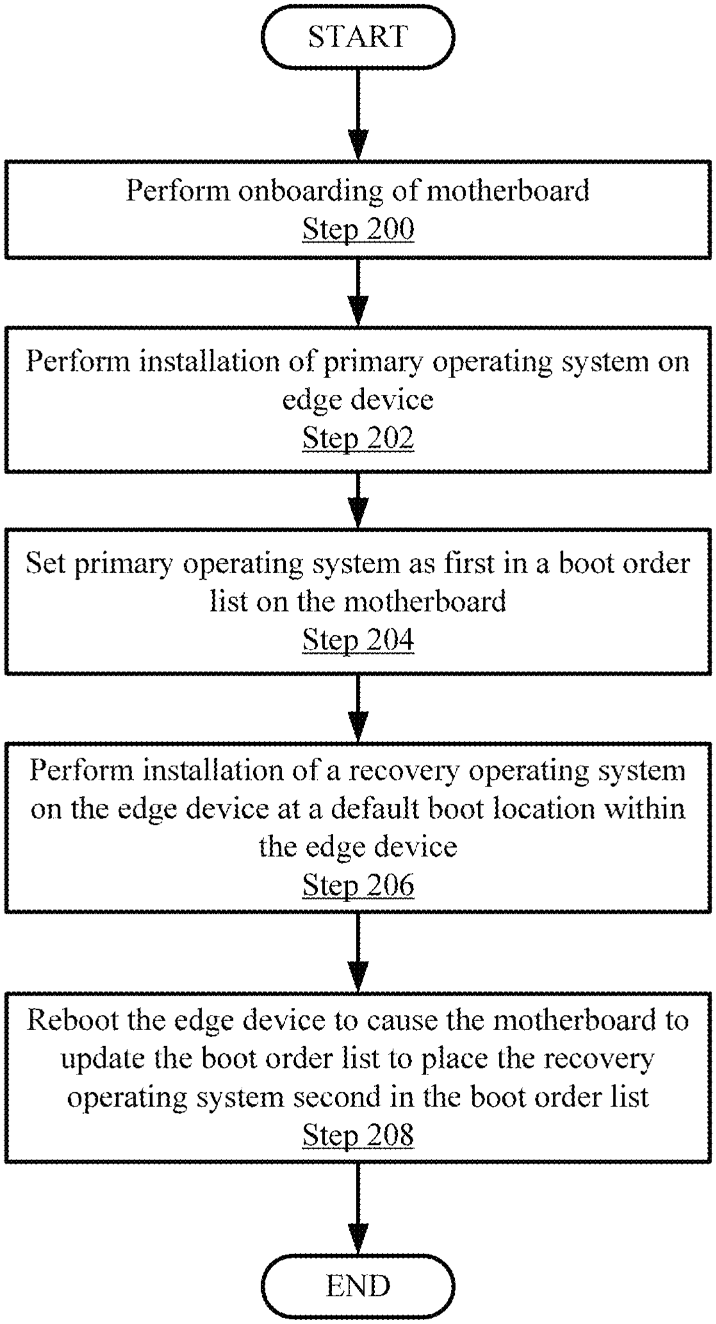
FIG. 2 shows a method for setting up a recovery operating system on an edge device in accordance with one or more embodiments.
Figure 3:
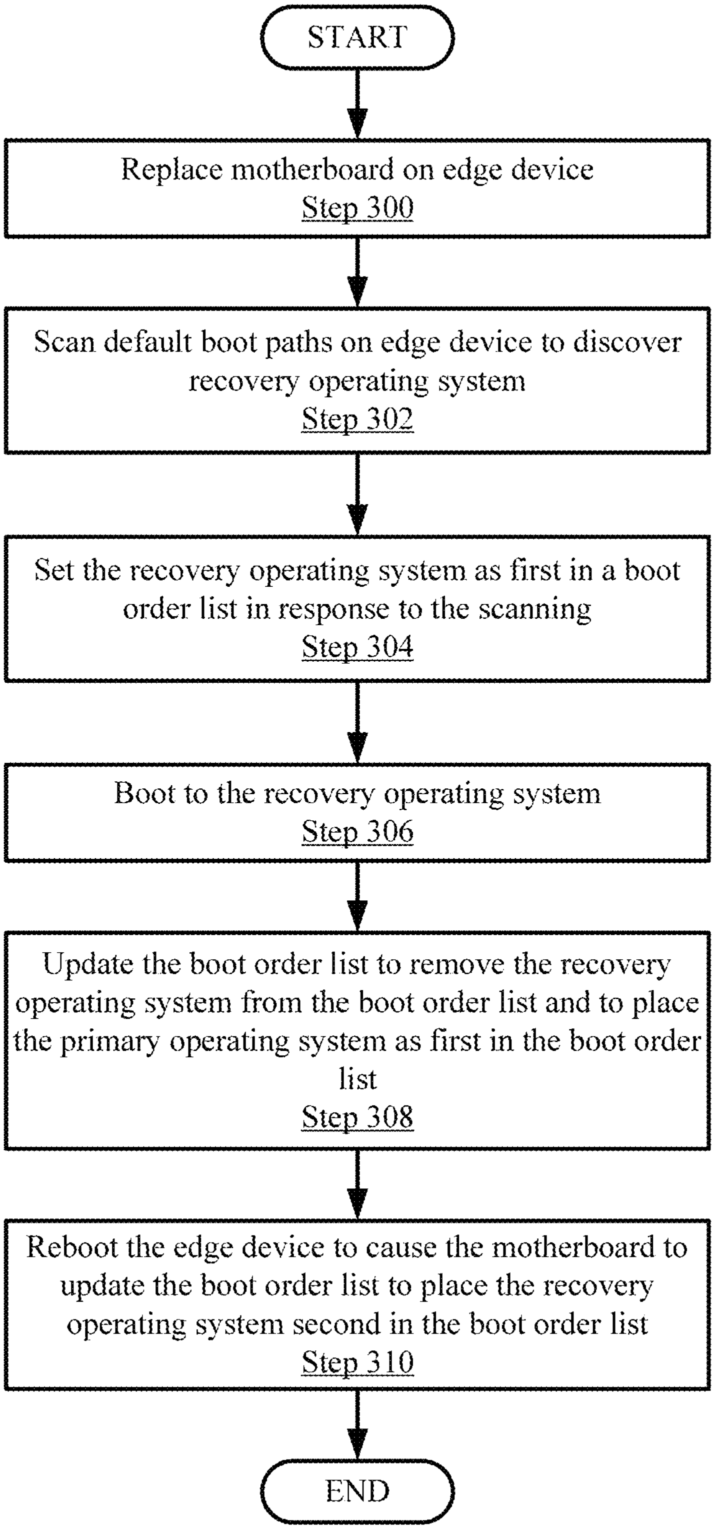
FIG. 3 shows a method for automatically setting a primary operating system as first on a boot order list on an edge device in accordance with one or more embodiments.

Further, the edge device (102) may include functionality to perform at least a portion of the methods shown in FIGS. 2-3. One of ordinary skill in the art will appreciate that the edge device (102) may perform other functionalities without departing from the scope of the embodiment disclosed herein.

In one or more embodiments, the edge device (102) and the remote device (106) may be operatively connected to one another through the network (104) (e.g., a local area network (LAN), a wide area network (WAN) such as the Internet, a mobile network, any other network type, or a combination thereof). The network (104) may be implemented using any combination of wired and/or wireless connections. Further, the network (104) may encompass various interconnected, network-enabled subcomponents (or systems) (e.g., switches, routers, gateways, etc.) that may facilitate communications between the edge device (102) and the remote device (106). Moreover, the edge device (102) and the remote device (106) may communicate with one another using any combination of wired and/or wireless communication protocols.

In one or more embodiments, the remote device (106) may include any network-enabled device that is capable of establishing a connection to the edge device (102) via the network (104). Non-limiting examples of such devices may include servers, computing devices (e.g., 400 in FIG. 4), IoT devices, IT environments, or any other device that communicates with the edge device(s) (102) to exchange data, perform processing tasks, or interact with other network components. Additionally, in one or more embodiments, the remote device (106) may include any number and any configuration of IT sub-systems, including, but not limited to, an intelligent support bundle service. Further, in one or more embodiments, the remote device (106) may represent any IT environment where operations therein may be performed independently or asynchronous to any operations transpiring throughout the edge device (102). Further, the remote device (106) may include functionality to perform at least a portion of the methods shown in FIGS. 2-3. One of ordinary skill in the art will appreciate that the remote device (106) may perform other functionalities without departing from the scope of the embodiment disclosed herein.

In one or more embodiments, the motherboard (108) includes the functionality to enable communication between physical components (e.g., processors, graphics processing units, etc.) of the edge device (102) and store data in the storage device (110). In one or more embodiments, the motherboard (108) may include dedicated storage (not shown) used to store startup information (e.g., a boot order list, BIOS settings, etc.) In one or more embodiments, the motherboard (108) may be operably connected to the edge device (102). Further, the motherboard (108) may include functionality to perform at least a portion of the methods shown in FIGS. 2-3. One of ordinary skill in the art will appreciate that the motherboard (108) may perform other functionalities without departing from the scope of the embodiment disclosed herein.

In one or more embodiments, the storage device (110) includes the functionality to store data (e.g., a primary operating system, a recovery operating system, etc.). The storage device (110) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the storage device (110) may be operably connected to the edge device (102). Further, the storage device (110) may include functionality to perform at least a portion of the methods shown in FIGS. 2-3. One of ordinary skill in the art will appreciate that the storage device (110) may perform other functionalities without departing from the scope of the embodiment disclosed herein.

Computers (e.g., edge device (102)) depend on operating systems (e.g., the primary operating system) to function properly. Operating systems serve as the fundamental software layer that manages hardware resources (processing resources, storage/memory resources, networking resources, etc.) and system operations. When booting, the motherboard (108) searches a boot order list to determine what operating system to which the computer will boot. It should be appreciated that, booting may refer to the process by which the computer initializes hardware resources and loads the operating system into the computer's memory (e.g., random access memory (RAM)) to start functioning after being powered on or restarted. When a new motherboard is installed or the motherboard is reset, the boot order list is cleared resulting in the motherboard defaulting to a UEFI enumeration boot order as described below in FIG. 3. Thus, it is important that the desired operating system is set as first in the boot order list to ensure the desired operation of the edge device. As discussed above, in some scenarios, a motherboard may fail or be wiped resulting in the boot order being lost. Further, recovering the original boot order list and the settings can be a difficult task often requiring information technology (IT) expertise. The method below in FIG. 2 describes a process for setting up a recovery operating system that can automatically recover a lost boot order list. Further, method below in FIG. 3 describes a process for using the recovery operating system set up in FIG. 2.

Turning to FIG. 2, FIG. 2 shows a flowchart of a method for setting up a recovery operating system on an edge device. The method may be performed by, for example, an edge device (e.g., 102, FIG. 1). Other components in the system may perform this method without departing from the embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a motherboard (e.g., 108 in FIG. 1) is onboarded onto the edge device. In one or more embodiments, the onboarding may include physically connecting various components, such as a processor, graphics processing unit, memory device(s), cooling component(s), human interaction device(s), etc. to the motherboard and configuring the motherboard's settings (e.g., BIOS settings).

In step 202, a primary operating system is installed onto the edge device. In one or more embodiments, the primary operating system may include any program with the capability to manage a computer's hardware and software resources (e.g., Windows, macOS, Linux, etc.). In one or more embodiments, the primary operating system may be stored in a storage device (e.g., 110 in FIG. 1) on the edge device. In one or more embodiments, the storage device may be accessible by a recovery operating system, as described below in FIG. 3. In one or more embodiments, the removable device (e.g., 100 in FIG. 1) may include a copy of the primary operating system (e.g., as an image), which is then used to install the primary operating system on the edge device. Further, installing the primary operating system causes the primary operating system to be stored at the selected file location within a storage of the edge device, the location of which may be selected automatically in accordance with default instructions contained within the installation package of the primary operating system or may be selected by a user.

In step 204, the primary operating system is set as first in the boot order list on the motherboard. In one or more embodiments, the boot order list refers to the sequence in which the motherboard prioritizes operating systems during startup to determine which operating system will be utilized during a boot sequence for the edge device. In one or more embodiments, the boot order list comprises file locations at which the associated operating system (e.g., an executable for the operating system) is stored. As such, in one or more embodiments, setting the primary operating system as first in the boot order list includes selecting the file location at which the primary operating system was installed in step 202. It should be appreciated, that any primary operating system known in the art or discovered in the future may be used in this step.

In step 206, the recovery operating system is installed onto the edge device at a default boot location within the storage device. In one or more embodiments, the default boot location refers to a location in the storage device that the motherboard is configured to automatically search for operating systems when booting, as described below in FIG. 3. For example, a manufacturer of a motherboard may configure the motherboard to search certain file system locations for an operating system. However, this location often does not match the location at which the primary operating system is installed due to differences in default locations chosen by manufactures of motherboards and makers of operating systems or users.

It should be appreciated, that installing the recovery operating system will not affect the primary operating system, such as its position as first in the boot order list. In one or more embodiments, the recovery operating system may include any program with the capability to manage the boot list order (i.e., place the primary operating system as first in the boot order list), as described below in FIG. 3. In one or more embodiments, the recovery operating system may be installed using the removable device as described above with respect to the primary operating system in step 202.

In step 208, the edge device is rebooted causing the motherboard to boot to the primary operating system and update the boot order list to place the recovery operating system second in the boot order list. In one or more embodiments, upon turning on the edge device, the motherboard is configured to search the one or more default locations to determine whether an operating system is located at the one or more default locations. If the motherboard does determine that an operating system is located at one of the default locations, the motherboard adds that operating system to the boot order list. In one or more embodiments, the motherboard is configured to add the new operating system to the bottom of the boot order list. As such, if an operating system, such as the primary operating system is already on the boot order list (e.g., first on the list), and there are no other operating systems on the boot order list, then the newly discovered operating system, such as the recovery operating system, is placed second on the boot order list. Further, as described in further detail in FIG. 3 below, if there are no operating systems currently on the boot order list, then the newly discovered operating system will be placed first on the list.

In one or more embodiments, booting refer to the process by which a computer (e.g., the edge device) initializes hardware (e.g., the motherboard, the storage, etc.) and loads the operating system (e.g., the primary operating system, the recovery operating system, etc.) into the computer's memory (e.g., random access memory (RAM)) to start functioning after being powered on or restarted. It should be appreciated, that when the edge device boots, the motherboard references the boot order list and sequentially checks each file location on the boot order list for available operating systems and boots using highest available operating system. It should be further appreciated, that since the primary operating system is first in the boot order list, the motherboard will boot using the primary operating system. It should be further appreciated, that the recovery operating system is available as a fallback if the primary operating system is unavailable as described below in FIG. 3.

In one or more embodiments, the method may end following step 208.

Turning to FIG. 3, FIG. 3 shows a method for automatically setting a primary operating system as first on a boot order list on an edge device. The method may be performed by, for example, an edge device (e.g., 102, FIG. 1). Other components in the system may perform this method without departing from the embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, a motherboard (e.g., 108, FIG. 1) is replaced on the edge device. In one or more embodiments, the motherboard is a new motherboard being physically installed onto the edge device. In one or more embodiments, the new motherboard is replacing another motherboard. For example, as described above, motherboards may fail or otherwise need to be replaced for a variety of reasons. In one or more embodiments, the new motherboard has an empty boot order list when it is physically installed on the edge device. Further, in one or more embodiments, it is not required that the motherboard is replaced, but only that the boot order list is cleared so that the recovery operating system can begin the recovery process, as described below.

In step 302, the motherboard scans default boot paths (i.e., file paths) within a storage device (e.g., 110 in FIG. 1) within the edge device, to discover a recovery operating system in a default boot location. In one or more embodiments, when the motherboard's boot order list is cleared, the motherboard may be configured to auto-populate boot entries by scanning a set of pre-set file paths. In one or more embodiments, boot entries added to the boot order list (e.g., via user input or via the recovery operating system) can override the auto-populated boot entries or, as described above, the auto-populated boot entries can automatically be added after user input boot entries. In one or more embodiments, the motherboard utilizes a Unified Extensible Firmware Interface (UEFI) firmware (i.e., a system firmware on most modem motherboards that manages a computer's boot process), using a UEFI enumeration order to manage the boot process. It should be appreciated, that the UEFI enumeration order may refer to a sequence in which the UEFI firmware identifies programs to boot to by scanning a set of pre-set boot paths (e.g., \\EFI\Boot\BootX64.efi) from all disk partitions it can find. In one or more embodiments, the default boot location is one of the pre-set boot paths. It should be appreciated, that using UEFI is not a requirement and that any similar firmware known in the art or discovered in the future may be used. The following is a non-limiting example of the UEFI Enumeration boot order:

| UEFI Boot Loader Enumeration Order Example: |
|---|
| 1. \\EFI\Boot\BootX64.efi |
| 2. \\EI\Microsoft\Boot\bootmgfw.efi (Windows Boot Manager) |
| 3. \\EFI\Ubuntu\shimx64.efi (Ubuntu) |
| 4. \\EFI\Suse\elilo.efi (Suse) |
| 5. \\EFI\Redhat\elilo.efi (RedHat) |
| 6. \\EFI\Redhat\grub.efi (RedHat) |
| 7. \\EFI\Redhat\shim.efi (RedHat) |
| 8. \\EFI\Centos\shim.efi (CentOS) |
| 9. \\EFI\android\grub.efi (Android) |
| 10 \\EFI\Microsoft\boot\cdboot.efi (Windows DVD) |

In step 304, the recovery operating system is set to first in the boot order list on the motherboard in response to the scanning. In one or more embodiments, the recovery operating system is automatically set as first in the boot order list as a result of the UEFI enumeration order, as described above. Further, as described above, the recovery operating system being set as first in the boot order also based on no other operating systems being included on the boot order list.

In step 306, the edge device boots to the recovery operating system. In one or more embodiments, the edge device boots to the recovery operating system because it is first in the boot order list. Further, in one or more embodiments, the booting process is the same as described above with respect to FIG. 2.

In step 308, the recovery operating system removes itself from the boot order list, locates the primary operating system in the storage device, and sets the primary operating system as first in the boot order list. In one or more embodiments, the recovery operating system may restore other settings on the motherboard (e.g., secure boot settings, platform TPM, certificates, keys, etc.). In one or more embodiments, the recovery operating system store a library of motherboard serial numbers and their corresponding settings in the storage device. In one or more embodiments, the recovery operating system can determine if the motherboard is new or is a previous motherboard that has been factory reset by comparing the current motherboard serial number with the previously recorded motherboard serial numbers. In the scenario that the motherboard is factory reset, the recovery operating system can recover all of the previous settings on the factory reset motherboard.

In step 310, the edge device is rebooted causing the motherboard to boot to the primary operating system and update the boot order list to place the recovery operating system second in the boot order list the boot order list.

In one or more embodiments, the method may end following step 310.

Figure 4:
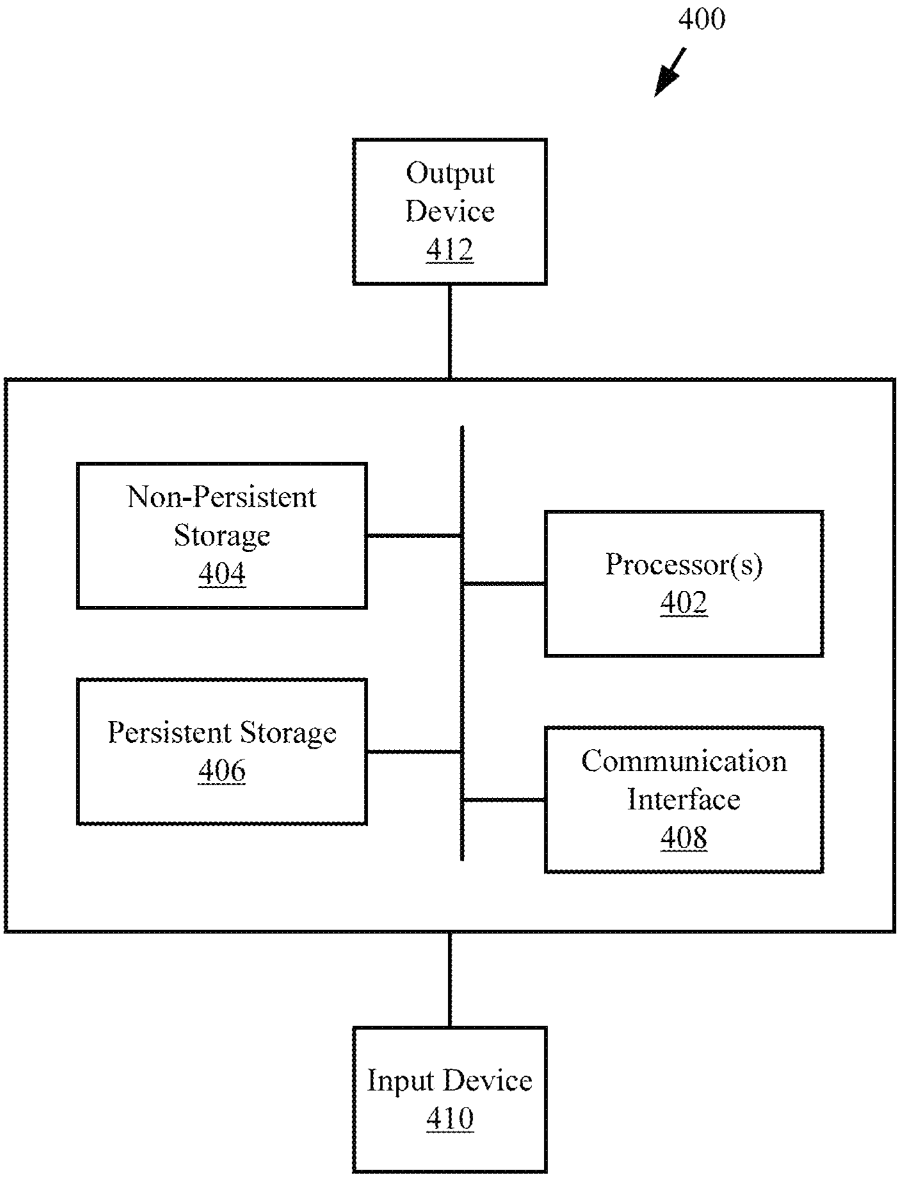
FIG. 4 shows a diagram of a computing system in accordance with one or more embodiments.

Embodiments of the disclosure may be implemented using computing devices. Turning to FIG. 4, FIG. 4 shows a diagram of a computing device (400) in accordance with one or more embodiments. The computing device (400) may include one or more computer processor(s) (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (408) (e.g., Bluetooth interface, infrared interface, network interface, optical interface, etc.), input devices (410), output devices (412), and numerous other elements (not shown) and functionalities. Each of these components is described below.

In one embodiment, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. The communication interface (408) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment, the computing device (400) may include one or more output devices (412), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (410, 412) may be locally or remotely connected to the computer processor(s) (402), non-persistent storage (404), and persistent storage (406). Many diverse types of computing devices exist, and the aforementioned input and output device(s) (410, 412) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments will now be described with reference to the accompanying figures. In the following detailed description of the embodiments, numerous specific details are set forth in order to provide a more thorough understanding of one or more embodiments. However, it will be apparent to one of ordinary skill in the art that the one or more embodiments may be practiced without these specific details. In other instances, well-known features have not been described in detail to avoid unnecessarily complicating the description.

In the prior description of the figures, any component described with regard to a figure, in various embodiments, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device (e.g., 110 in FIG. 1), a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for automatically setting a primary operating system as first on a boot order list on an edge device, the method comprising:

performing a first scan, via a motherboard, of default boot paths on local storage to discover a recovery operating system;

auto-populating, using the motherboard, the boot order list to place the recovery operating system as first in the boot order list in response to the first scan;

booting to the recovery operating system in response to the auto-populating;

performing a first update, using the recovery operating system, to the boot order list to remove the recovery operating system from the boot order list and to place the primary operating system as first in the boot order list; and booting to the primary operating system after updating.

2. The method of claim 1, further comprising:

performing a second update, prior to booting to the primary operating system, to the boot order list to place the recovery operating system as second in the boot order list.

3. The method of claim 2, wherein performing the second update comprises:

performing a second scan, via the motherboard, of the default boot paths on the local storage to discover the recovery operating system.

4. The method of claim 1, further comprising:

replacing, prior to performing the first scan, a second motherboard with the motherboard.

5. The method of claim 4, further comprising:

performing an initial start-up process prior to replacing the second motherboard.

6. The method of claim 5, wherein performing the initial start-up process comprises:

performing an onboarding of the edge device;

installing the primary operating system onto the edge device after the onboarding;

setting, using the second motherboard, the primary operating system as first in the boot order list;

installing the recovery operating system on the edge device, wherein the recovery operating system is installed at a default boot location within the edge device;

performing a third update, using the second motherboard, to the boot order list to place the recovery operating system second in the boot order list; and booting to the primary operating system after the third update.

7. The method of claim 6, wherein the default boot paths comprise the default boot location.

8. A non-transitory computer readable medium (CRM) comprising computer readable program code, which when executed by a computer processor, enables the computer to perform a method for automatically setting a primary operating system as first on a boot order list on an edge device, the method comprising:

performing a first scan, via a motherboard, of default boot paths on local storage to discover a recovery operating system;

auto-populating, using the motherboard, the boot order list to place the recovery operating system as first in the boot order list in response to the first scan;

booting to the recovery operating system in response to the auto-populating;

performing a first update, using the recovery operating system, to the boot order list to remove the recovery operating system from the boot order list and to place the primary operating system as first in the boot order list; and booting to the primary operating system after updating.

9. The non-transitory CRM of claim 8, wherein the method further comprises:

performing a second update, prior to booting to the primary operating system, to the boot order list to place the recovery operating system as second in the boot order list.

10. The non-transitory CRM of claim 9, wherein performing the second update comprises:

performing a second scan, via the motherboard, of the default boot paths on the local storage to discover the recovery operating system.

11. The CRM of claim 8, wherein prior to performing the first update, the recovery operating system locates the primary operating system on the edge device using a preset file path.

12. The non-transitory CRM of claim 8, wherein the method further comprises:

replacing, prior to performing the first scan, a second motherboard with the motherboard.

13. The non-transitory CRM of claim 12, wherein the method further comprises:

performing an initial start-up process prior to replacing the second motherboard.

14. The non-transitory CRM of claim 13, wherein performing the initial start-up process comprises:

performing an onboarding of the edge device;

installing the primary operating system onto the edge device after the onboarding;

setting, using the second motherboard, the primary operating system as first in the boot order list;

installing the recovery operating system on the edge device, wherein the recovery operating system is installed at a default boot location within the edge device;

updating, using the recovery operating system, the boot order list to place the recovery operating system second in the boot order list; and booting to the primary operating system after updating.

15. An edge device for automatically setting a primary operating system as first on a boot order list, the edge device comprising:

persistent storage; and a motherboard, comprising a processor and memory, programmed to:

perform a first scan of default boot paths on the persistent storage to discover a recovery operating system;

auto-populate the boot order list to place the recovery operating system as first in the boot order list in response to the first scan;

boot to the recovery operating system in response to the auto-populating;

performing a first update, using the recovery operating system, to the boot order list to remove the recovery operating system from the boot order list and to place the primary operating system as first in the boot order list; and boot to the primary operating system after updating.

16. The system of claim 15, wherein the motherboard is further programmed to:

perform a second update, prior to booting to the primary operating system, to the boot order list to place the recovery operating system as second in the boot order list.

17. The system of claim 16, wherein performing the second update comprises:

performing a second scan, via the motherboard, of the default boot paths on the persistent storage to discover the recovery operating system.

18. The system of claim 15, wherein the boot order list is cleared prior to the first scan.

19. The system of claim 18, wherein the motherboard is further programmed to:

perform an initial start-up process prior to the clearing of the boot order list.

20. The system of claim 19, wherein performing the initial start-up process comprises:

performing an onboarding of the edge device;

setting, based on a user input, the primary operating system as first in the boot order list;

updating, based on instructions from the recovery operating system, the boot order list to place the recovery operating system second in the boot order list; and booting to the primary operating system after updating.

* * * * *